No. 653,298. Patented July 10, 1900.
W. A. KING.
TRANSPLANTER.
(Application filed Oct. 25, 1899.)
(No Model.) 3 Sheets—Sheet 1.

WITNESSES
M E Fowler
James R Mansfield

INVENTOR
Warner A. King.
By
Alexander & Dowell
Attorneys

THE NORRIS PETERS CO., PHOTO-LITHO., WASHINGTON, D. C.

No. 653,298. Patented July 10, 1900.
W. A. KING.
TRANSPLANTER.
(Application filed Oct. 25, 1899.)
(No Model.) 3 Sheets—Sheet 2.
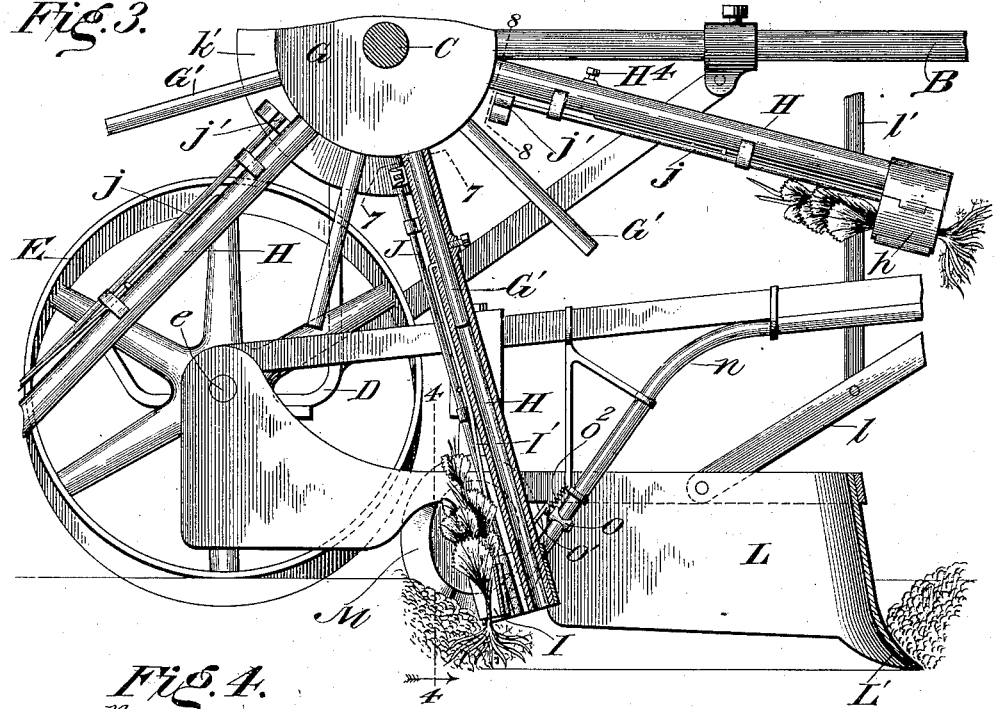
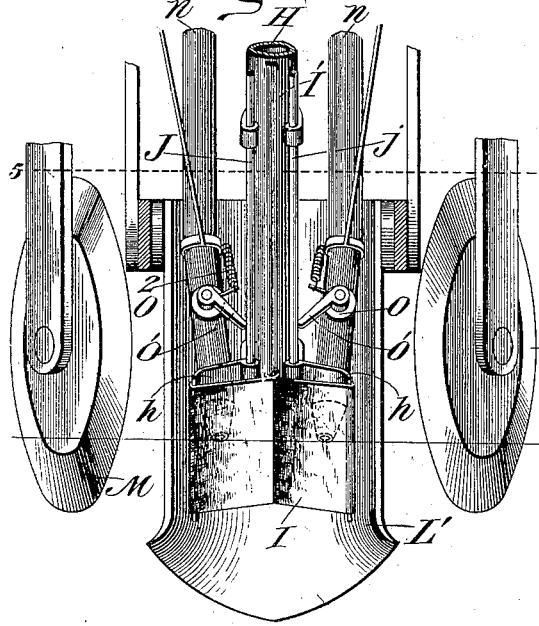
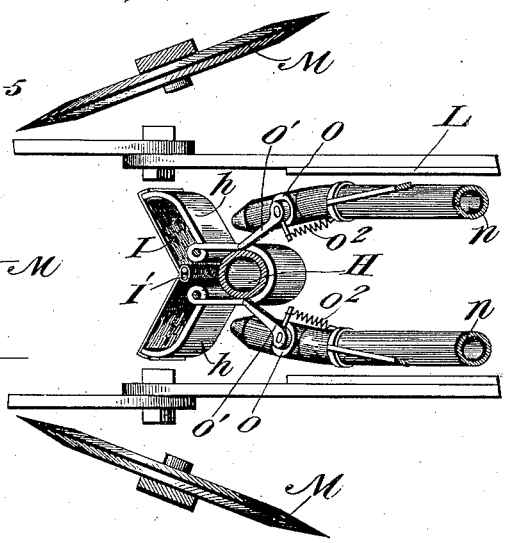
WITNESSES
INVENTOR
Warner A. King
By Alexander & Dowell
Attorneys No. 653,298. Patented July 10, 1900.
W. A. KING.
TRANSPLANTER.
(Application filed Oct. 25, 1899.)
(No Model.) 3 Sheets—Sheet 3.
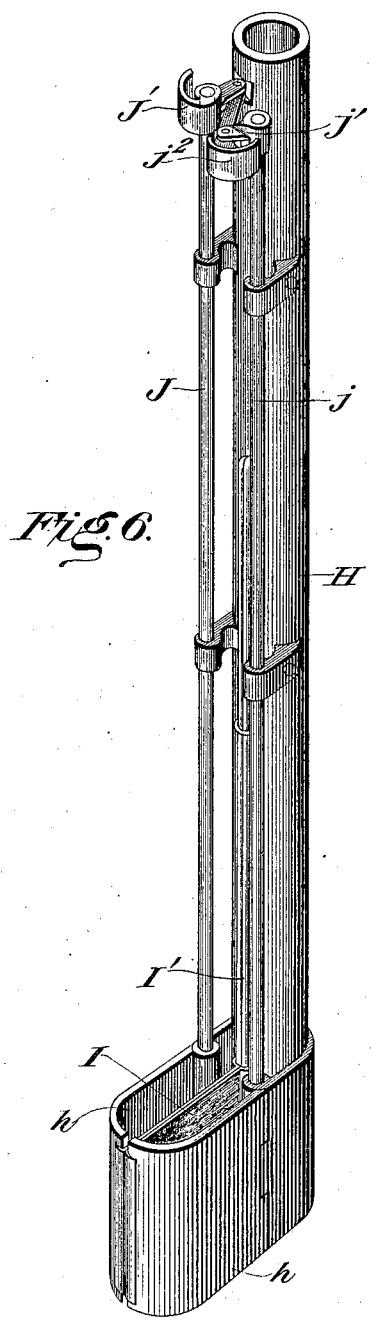
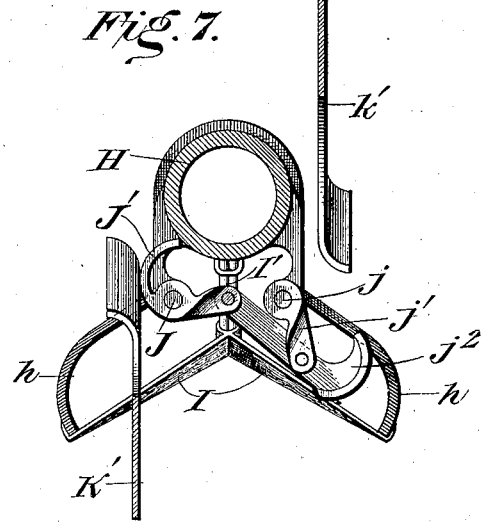
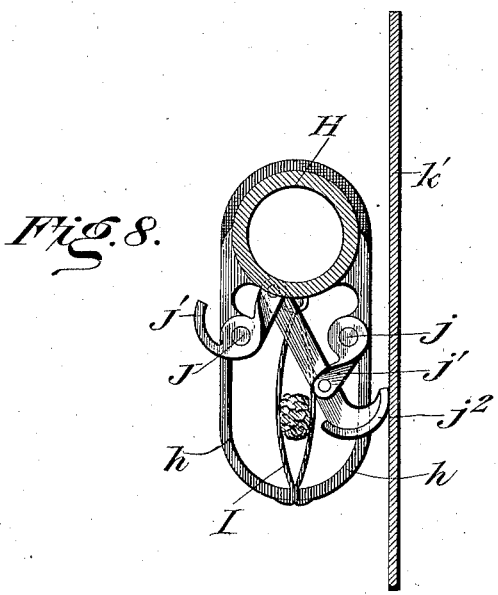

UNITED STATES PATENT OFFICE.

WARNER A. KING, OF MARYSVILLE, OHIO.

TRANSPLANTER.

SPECIFICATION forming part of Letters Patent No. 653,298, dated July 10, 1900.

Application filed October 25, 1899. Serial No. 734,693. (No model.)

*To all whom it may concern:*

Be it known that I, WARNER A. KING, of Marysville, in the county of Union and State of Ohio, have invented certain new and useful Improvements in Transplanters; and I hereby declare that the following is a full, clear, and exact description thereof, reference being had to the accompanying drawings, which form part of this specification.

This invention is an improved machine for transplanting small plants, bulbs, &c., in a rapid and expeditious manner.

In order that the transplanter may properly operate, it must first open a furrow in the ground, then set the plants properly in the furrow and preferably water the roots of the plants, and then pack the same with earth. It is also highly desirable in practical machines that the transplanter be adapted to handle with equal facility plants of various sizes and also roots and bulbs, and in order that it may do this it is necessary that the devices which handle the plant or by which the plant is held and inserted in the ground have yielding or self-adjusting action somewhat similar to the hand of a person, so that they will hold small or large plants with equal certainty and yet without injury to the stems or roots of such plants.

One of the principal features of my present invention is the mechanical "hand," by which the plants are grasped and carried to the furrows and released after they have been properly inserted therein.

The invention also embodies novel means for operating the hands and also the complete machine for opening the furrows, inserting and watering the plants, and covering them in the furrow.

By my machine also the distances between the plants can be varied at will, according to the number of mechanical hands employed.

The essential features of the invention and upon which a patent is desired are set forth in the claims, and the accompanying drawings illustrate one practical form of the apparatus; but it is obvious that various changes may be made therein without departing from the scope of the invention.

Figure 1:
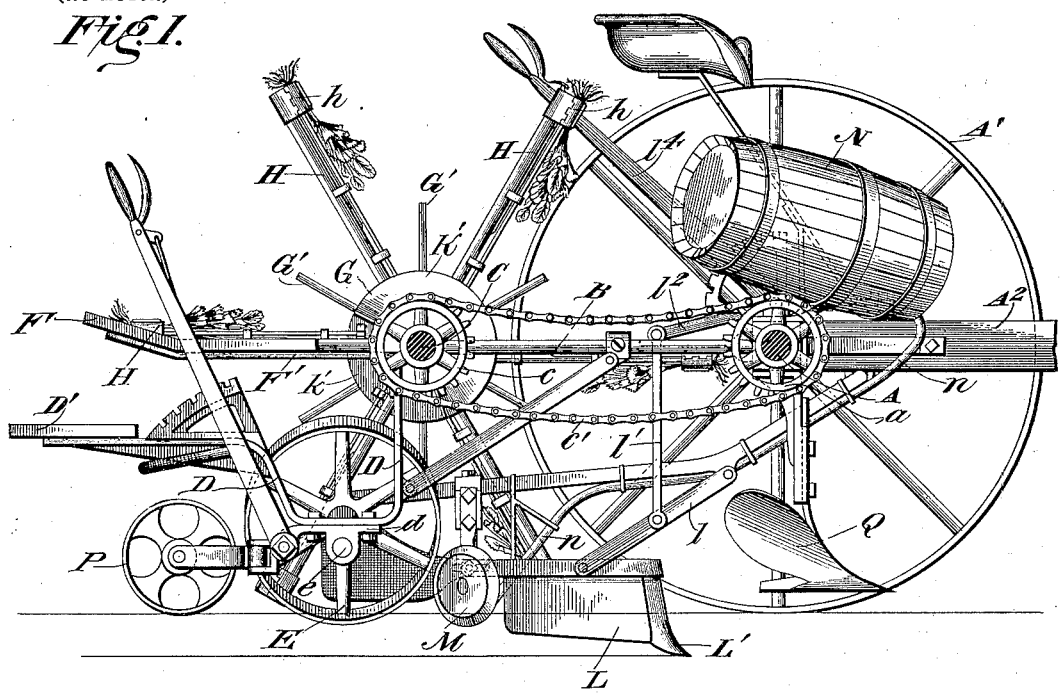
Figure 2:
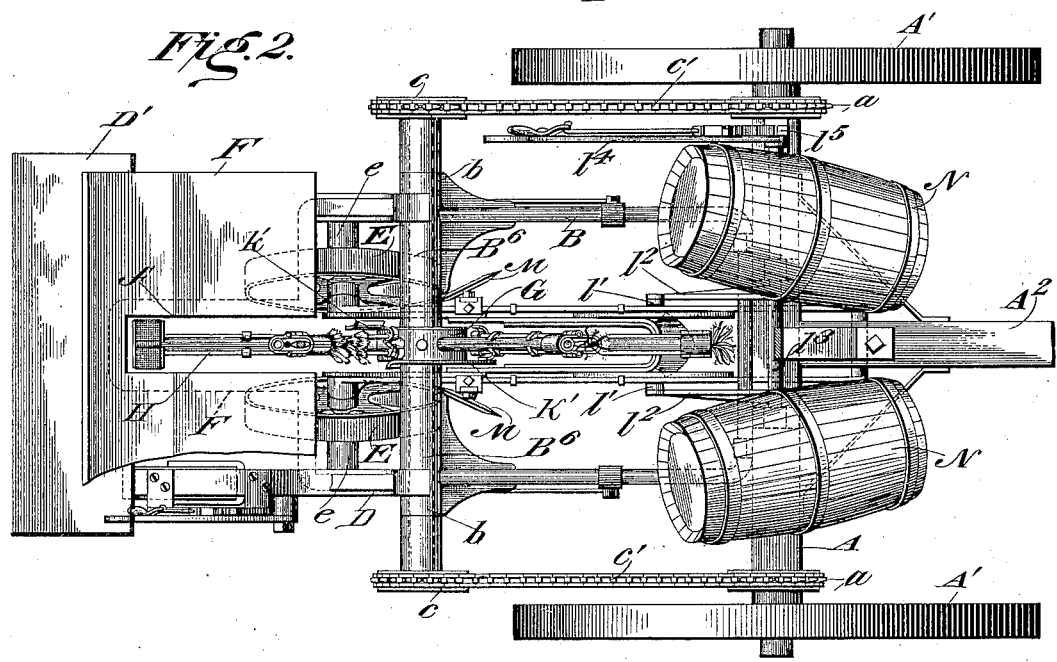

In said drawings, Figure 1 is a side elevation of the machine complete with the near supporting-wheel removed. Fig. 2 is a top plan view of the machine. Fig. 3 is an enlarged longitudinal sectional view of a portion of the machine, showing it in the act of planting. Fig. 4 is a detail vertical sectional view, somewhat enlarged, taken on the line 4 4 of Fig. 3 and looking forward. Fig. 5 is a detail horizontal sectional view taken on line 5 5 of Fig. 4 and looking down. Fig. 6 is a detail in perspective of one of the plant-holders or hands; and Figs. 7 and 8 are enlarged detail sectional views of the hands, taken on the lines 7 7 and 8 8, respectively, of Fig. 3.

A designates the main axle of the machine, carried by the wheels $A'$, provided with a tongue $A^2$. To this axle is connected a frame B, which is capable of swinging vertically relatively to the axle and is provided with bearings $b$ for a transverse shaft C, which lies parallel to the axle and may be rotated by sprockets $c$ and chains $c'$ from sprockets $a$ on the hubs of the wheels $A'$, as shown.

To the rear end of the frame B are connected the strap-irons D, which are bent downward and rearward and support on their rear ends the seat or stand $D'$, upon which the attendant who feeds the plants to the machine rides. The bars D are provided with bearings $d$ for the shafts $e$ of the opposite packing-wheels, which are preferably inclined at an angle to each other and are arranged in about the central line of the machine, as shown, sufficient space being left between them for the passage of the mechanical hands or plant-carrying devices H, hereinafter described.

Supported on the frame B in rear of the shaft C is a table F, which stands above the attendant's platform and is upheld by means of bars $F'$, attached to the frame B, and this table is provided with a longitudinal slot $f$, through which move the mechanical hands or plant-holders H.

Upon the shaft C and in the center of the machine is mounted a disk G, to which the plant-holders or mechanical hands H are preferably removably attached in any suitable manner. As shown, the disk is provided with a series of radial pins or spokes $G'$, over any one of which may be slipped the tubular end of the hand, which may be secured thereto by a set-screw $H^4$. More or less of these hands are employed according to the distances at which the plants are to be placed, and they may be easily removed or detached from the disk, as is obvious. Each hand, as shown, is composed of a stem H, preferably tubular, so as to fit easily upon the spoke or pin of the disk G. To the outer end of this bar are attached two opposite hinged plates $h$, (see Figs. 6 to 8,) to the free extremities of which are attached the ends of a webbing I, which is attached centrally to a spring rod or rods I', fastened to the stem H, and the tendency of the spring is always to keep the webbing taut whether the hands be open or closed. When the hand is open, the springs I' are pulled away from the stem H, as shown in Fig. 7, and when the hand is closed the rods I' lie close to the stem H, as shown in Figs. 6 and 8. The plates $h$ are respectively connected to hinge-rods J and $j$, which extend parallel with the stem, being suitably guided in lugs thereon, and rod J is provided at its inner end, near the disk G, with a cam-piece J', and rod $j$ is provided with a crank-arm $j'$, which is connected to a cam-piece $j^2$, the extremity of which is connected to an extension of the cam J', as shown in Figs. 6 and 7, the construction being such that if the cam J' be pushed backward it will throw the plates $h$ apart, as indicated in Fig. 7, while if cam $j^2$ be pushed backward it will throw the plates $h$ together, as indicated in Fig. 8. Thus the cam J' causes the opening of the hand and cam $j^2$ causes the closing thereof, and one plate cannot move without the other.

The hands are attached to the disk G, as described, with the cams J' $j^2$, facing toward the opposite sides of the disk and respectively adapted to engage with stationary cams K' and $k'$, fixed to the sleeves $B^6$, attached to the frame B close beside the disk, as shown. These cams are segmental and would together form a complete circle, but are so arranged that cam J' will be free when cam $j^2$ is engaged with its cam $k'$, and vice versa. The cams K' and $k'$ are so located that the hands will be positively opened and closed at the proper time in revolving around the shaft C. For instance, each hand will be opened just after it has placed the plant in the furrow and will remain open until it rises through the slot $f$ in table F, at which point and time a plant will be laid upon the hand by the attendant, and then as the hand moves farther cam $j^2$ engages cam $k'$ and causes the hand to close upon the plant and hold the same firmly until it is placed by the hand in the furrow, and then cam J' engages cam K' and causes the hand to open, leaving the plant in the furrow, the hand slipping or advancing away from the plant as the machine progresses.

The furrow may be opened by any suitable means. As shown, I preferably employ the U-shaped furrow-opener L, which is provided with a shovel-point L' and with sides which extend back sufficiently to keep the furrow open and allow the hands to place the plants therein. Just in rear of the furrow-opener L and in position to throw dirt around the roots of the plant as they are placed in position are the furrow-closing disks M, and in rear of these furrow-closing disks are the packing-wheels E, before referred to.

Upon the axle A of the main frame of the machine are mounted the water tanks or barrels N, which may be of any suitable construction so as not to interfere with the orbital movement of the hands. Water may be conducted from these tanks by pipes $n$ into the furrow-opener L at a point so as to apply the water to the roots of the plant brought forward by the hand. The pipes $n$ are preferably provided with spring-actuated plug-cocks O, provided with handles O', which project into the path of the hands so as to be struck by the latter just as they place the plant in the furrow, and the valves being closed by the springs $O^2$ as soon as the hand passes.

The furrow-opener L may be attached to the frame by pivoted links $l$, which are in operation connected by links $l'$ to crank-arms $l^2$ on the rock-shaft $l^3$, which is provided with lever $l^4$, having a handle and catch adapted to engage a segment $l^5$, so that the furrow-opener may be elevated and locked in such position during transportation of the machine.

Caster-wheels P may be attached to the frame by means of suitable rock-shafts and levers, as shown, by which said wheels can be raised or depressed at will. When depressed, the caster-wheels may lift the rear portion of the apparatus entirely clear of the ground, as is desirable in transportion of the apparatus, and the caster-wheels also can be set so as to regulate the depth at which the machine shall plant. By adjusting the furrow-opener L the depth of the furrow can of course also be regulated.

It is desirable to plant some roots or vegetables in furrows and others in ridges, and for convenience adjustable shovels Q may be attached to the axle in front of the furrow-opener. These shovels may be adjusted up or down and may be changed from right to left. In this way the ground may be either hilled or furrowed in advance of the furrow-opener, so that the vegetables may be planted in hollows or on ridges.

If desired, the shaft C and the hands H might be operated by check-rower attachments instead of from the axle of the machine, as is shown, and this I would consider within the province of my invention.

The chief feature of my machine I consider the mechanical hands, for it will be observed that they grasp the plant with a firm but yielding pressure, holding the same between two tightly-stretched layers of flexible yielding material I—such as fabric, leather, or other suitable material—and while the plates $h$ are positively closed in carrying the plant from the table to the ground, yet the grasp of the hand on the plant is practically the same whether it be large or small, this pressure being applied by the spring I' tightening the fabric I. Thus the same hand can operate with equal facility on large or small plants and without crushing. As a precautionary measure in case a very large plant should get into the hand or should become misplaced therein, so as to prevent the closing of the plates $h$, the rods J and $j$ may either be torsional springs, so as to permit the cams J' and $j^2$ to operate properly without breaking, or a short section of the rods J and $j$ might be made of stout coiled springs, which would permit the proper action of the cams without breakage of the parts if the plates $h$ were abnormally separated at a time when they should be closed.

The operation of the machine may be readily comprehended from the foregoing and is briefly as follows: The operator rides upon the platform D', with a supply of plants lying upon the table F before him. The furrow-opener L is lowered to the proper depth. As the machine is driven forward the hands H are rotated in the direction in which the machine is moving. As each hand rises through the slot $f$ in the table F it is opened and the attendant lays a plant therein, the stalks pointing toward the disk G. The hand then closes upon the plant and is swung forward and around and lowered, as indicated in Fig. 3, at which point the disks M begin to throw dirt around the roots of the plant, and simultaneously a supply of water is admitted thereto through the pipes $n$, the cocks being struck by the hands striking the levers O'. Then as the machine progresses forward the hand leaves the plant and remains open until it again rises to and through the slot $f$ in the table F. The dirt is thrown around the plant by the coverer M, and the packing-wheels E pack the earth securely around the plant, which is thus properly planted.

The machine is designed for planting all kinds of small vegetables and is also adapted for planting roots and even grains, if desired, and other seeds; but of course its principal use is for planting vegetables.

Having thus described my invention, what I therefore claim as new, and desire to secure by Letters Patent, is—

1. In a transplanting-machine, the combination of a hand, comprising opposite hinged movable plates and a flexible or yielding plant-grasping band having its opposite extremities connected to the free ends of said plates and adapted to be opened and closed by the swinging of the plates, and means for operating said plates.

2. In a transplanting-machine, the combination of a stem, oppositely-movable plates attached thereto, a flexible plant-grasping band, having its extremities attached to the opposite plates and its intermediate portion loosely connected to the stem whereby the band may be opened or closed, by moving said plates, and means for operating said plates to cause the opening and closing thereof.

3. In a plant-holding device for transplanting-machines, the combination of a stem, the opposite hinged plates attached thereto, the flexible band between said plates having its extremities connected thereto, and its center portion yieldingly connected to the stem whereby said band is kept taut in all positions of the plates, substantially as described.

4. In a plant-holding device for transplanting-machines the combination of a stem, the opposite curved plates hinged thereto, the flexible band inclosed between said plates and having its extremity connected to the outer ends thereof and its center portion yieldingly connected to the stem by a spring-rod, and means for operating said plates, substantially as described.

5. In a plant-holding device for transplanting-machines, the combination of a stem, the opposite plates hinged thereto, and a yielding plant-grasping device between said plates and operated thereby; with a rotary support for said stem, the toggles for actuating the plates, and the opposite cam-plates beside the rotary support adapted to operate said toggles, for the purpose and substantially as described.

6. In a plant-holding device for transplanting-machines, the combination of a stem, the opposite plates hinged thereto, and the flexible band inclosed between said plates and having its extremities connected to the outer ends thereof; with a rotary support for said stem, the rods for actuating the plates, the toggle connections between said rods, and the opposite cam-plates beside the rotary support adapted to engage said cams, for the purpose and substantially as described.

7. In a plant-holding device for transplanting-machines, the combination of a stem, the oposite curved plates hinged thereto, the flexible band inclosed between said plates and having its extremities connected to the outer ends thereof and its center portion yieldingly connected to the stem by a spring-rod whereby said band is kept taut in all positions of the plate; with a rotary support for said stem, the hinged rods for actuating the plates, the toggle connections between said rods, the opposite cams attached to said rods, and the opposite cam-plates beside the rotary support adapted to engage said cams, for the purpose and substantially as described.

8. In a transplanting-machine, the combination of a furrow-opener, a rotary disk, a feed-table beside the disk, a series of mechanical hands attached to said disk, each consisting of a stem, a pair of hinged plant-grasping plates attached to the outer ends of the said stem, the hinge-rods of said plates, the cams attached to the inner ends of said rods, and the cam-plates fixed beside the disk adapted to cause the opening and closing of the said plates.

9. In a transplanting-machine, the combination of the rotary disk, the opposite segmental cam-plates beside the same, a series of plant-holding hands secured to said disk and rotated thereby, each consisting of a stem, a pair of hinged plates at the outer end of said stem, the flexible piece interposed between said plates having its outer ends connected thereto and the spring attached to the central portion of said flexible piece and the stem, whereby a yielding grasp is had upon the stems of the plants, for the purpose and substantially as described.

10. In a transplanting-machine, the combination of the rotary disk, the opposite segmental cam-plates beside the same, a series of plant-holding hands secured to said disk and rotated thereby, each consisting of a stem, a pair of hinged plates at the outer end of said stem, the hinged rods supporting said plates extending inwardly toward the disk, and the cam-pieces attached to the opposite rods respectively adapted to engage the opposite cam-plates whereby the hands are opened and closed at the proper times.

11. In a transplanting-machine, the combination of the rotary disk, the opposite segmental cam-plates beside the same, a series of plant-holding hands secured to said disk and rotated thereby, each consisting of a stem, a pair of hinged plates at the outer end of said stem, the hinged rods supporting said plates extending inwardly toward the disk, the cam-pieces attached to the opposite rods respectively adapted to engage the opposite cam-plates whereby the hands are opened and closed at the proper times, the flexible piece interposed between said plates having its outer ends connected thereto, and the spring attached to the central portion of said flexible piece and the stem, whereby a yielding grasp is had upon the stems of the plants, for the purpose and substantially as described.

12. In a transplanting-machine, the combination of a furrow-opener, a rotary disk, a feed-table beside the disk, a series of mechanical hands attached to said disk, each consisting of a stem, a pair of hinged plant-grasping plates at the outer ends of said stem, and means for opening and closing the said plates; with the water-tank, a pipe leading from said tanks into the furrow-opener, and the valves in said pipe adapted to be opened by the swinging hands, substantially as described.

13. In a transplanting-machine, the combination of a furrow-opener, a hinged frame, a rotary disk journaled therein, a feed-table beside the disk, a series of mechanical hands attached to said disk, each consisting of a stem, a pair of hinged plant-grasping plates at the outer ends of said stem, the hinged rods of said plates, and the cams attached to the inner ends of said rods, the cam-plates fixed beside the disk adapted to cause the opening and closing of the said plates; with means for adjusting said furrow-opener and said frame relatively to the ground, for the purpose and substantially as described.

14. In a transplanting-machine, the combination of a furrow-opener, a rotary disk, a feed-table beside the disk, a series of mechanical hands attached to said disk, each consisting of a stem, a pair of hinged plant-grasping plates at the outer ends of said stem, the hinge-rods of said plates, and the cams attached to the inner ends of said rods, and the cam-plates fixed beside the disk adapted to cause the opening and closing of the said plates; the main frame, the water-tank thereon, pipes leading from said tank into the furrow-opener, and the valve in said pipe adapted to be opened by the swinging hands, and means for adjusting said furrow-opener and said frame relatively to the ground, for the purpose and substantially as described.

15. The combination of the wheeled frame, the swinging frame attached thereto, a rotary shaft journaled in said frame, and means for driving said shaft from the main wheels, a rotary disk on said shaft, and the slotted table supported on said frame in rear of said disk; with a series of hands attached to said disk and rotated thereby, each having a pair of opposite hinged clamping-plates on its outer end, the hinged rods of said plates extending inward toward the disk, and the fixed segmental cams beside the disk adapted to cause the opening and closing of the hands, for the purpose and substantially as described.

16. The combination of the wheeled frame, the swinging frame attached thereto, a rotary shaft journaled in said frame, and the sprockets and chains for driving said shaft from the main wheel, a rotary disk on said shaft, the slotted table also supported on said frame in rear of said disk; a series of hands attached to said disk and rotated thereby, each having a pair of opposite hinged clamping-plates on its outer end, the hinged rods of said plates extending inward toward the disk, and the fixed segmental cams attached to said frame beside the disk adapted to cause the opening and closing of the hands; with a furrow-opener in front of said disk, covering or packing wheels in rear of said furrow-opener, the water-supply pipes, and the adjustable caster-wheel attached to the rear of the frame, for the purpose and substantially as described.

In testimony that I claim the foregoing as my own I affix my signature in presence of two witnesses.

WARNER A. KING.

Witnesses:
J. H. KINKADE,
THOMAS MULCAHY.